(12) United States Patent
Long et al.

(10) Patent No.: US 12,434,820 B2
(45) Date of Patent: Oct. 7, 2025

(54) AIRCRAFT LANDING GEAR WITH TENSION DRAG BRACE

(71) Applicant: The Boeing Company, Arlington, VA (US)

(72) Inventors: Michael A. Long, Langley, WA (US); Justin Duane Cottet, Snohomish, WA (US); Christopher M. Newton, Bothell, WA (US)

(73) Assignee: THE BOEING COMPANY, Arlington, VA (US)

( * ) Notice: Subject to any disclaimer, the term of this patent is extended or adjusted under 35 U.S.C. 154(b) by 86 days.

(21) Appl. No.: 18/521,996

(22) Filed: Nov. 28, 2023

(65) Prior Publication Data

US 2025/0171134 A1    May 29, 2025

(51) Int. Cl.
*B64C 25/20* (2006.01)
*B64C 25/36* (2006.01)

(52) U.S. Cl.
CPC .............. *B64C 25/20* (2013.01); *B64C 25/36* (2013.01)

(58) Field of Classification Search
CPC ......... B64C 25/04; B64C 25/10; B64C 25/12; B64C 2025/125; B64C 25/34; B64C 25/14
See application file for complete search history.

(56) References Cited

U.S. PATENT DOCUMENTS

| | | | |
|---|---|---|---|
| 4,720,063 A | | 1/1988 | James et al. |
| 4,915,324 A | * | 4/1990 | Foreau .................... B64C 25/66 244/102 R |
| 5,100,083 A | | 3/1992 | Large et al. |
| 5,692,703 A | * | 12/1997 | Murphy .................. B64C 25/04 244/119 |
| 2013/0299633 A1 | * | 11/2013 | Tierney ................... B64C 25/14 244/102 R |

OTHER PUBLICATIONS

Long et al., "Aircraft Landing Gear with Compression Drag Brace," U.S. Appl. No. 18/521,978, filed Nov. 28, 2023.

* cited by examiner

*Primary Examiner* — Ashesh Dangol
(74) *Attorney, Agent, or Firm* — MH2 Technology Law Group LLP (57) ABSTRACT

An aircraft includes: a wing landing gear; and a body landing gear which includes a shock absorber strut assembly comprising a wheel, a fixed truss structure and an aircraft structure connection point, a drag brace, and a pivot joint that connects the fixed truss structure to the drag brace; and a body landing gear wheel well configured to store the body landing gear in a stowed position. The drag brace includes an upper drag brace, and a lower drag brace pivotingly attached to the upper drag brace. In a stowed position, the shock absorber strut assembly, the fixed strut structure, the upper drag brace and the lower drag brace may be positioned outside of a swing path of a wing landing gear of the aircraft. In the deployed position, the lower drag brace may be positioned in the swing path of the wing landing gear of the aircraft.

20 Claims, 5 Drawing Sheets

AIRCRAFT LANDING GEAR WITH TENSION DRAG BRACE

FIELD

This disclosure relates generally to aircraft landing gear and more particularly to retractable supplemental landing gear.

BACKGROUND

Some airplanes have main landing gear (MLG) with a main landing gear ground contact point (center of tire pattern) that is located near the airplane's center of gravity. This location applies a high vertical load to the brake-enabled wheels and near the wing's center of lift to facilitate airplane rotation with a smaller tail area. The main landing gear height and location also determine the maximum airplane rotation angle on takeoff and landing. Some large airplanes need multiple main landing gear with additional wheels to better improve pavement loading, distribute wheel, tire, and brake loads, and increase the total brake mass. Some large airplanes are developed as families containing higher weight model versions. As airplane weights increase, it may be difficult to add wheels without disrupting the rest of the airplane configuration.

Some wing-mounted main landing gear (WLG) post arrangements retract inboard to stow in the fuselage. Additional post locations can be body mounted and retract fore or aft, stowing between the WLG wheel wells or aft of the WLG wheel wells due to the limited volume available. MLG arrangements have negative airplane characteristic if they are not longitudinally aligned. Any fore-aft offset between the WLG and body landing gear (BLG) can result in decreased steering efficiency, which can result in increased turn radius and/or tire scrubbing and/or loading issues on takeoff and landing.

A need exists for solutions to the above problems.

SUMMARY

A BLG that mounts to the WLG wheel well aft bulkhead (which is existing primary structure) and has a forward cant angle produces a prominent forward ground contact point, relative to its mounting location on the airplane, and that is substantially more in-line (transversely) with the WLG will minimize the negative characteristics of steering and loads during rotation, and may require no mitigation.

A pair of BLG that are mounted outboard of the existing keel beam structure of the airplane can preserve a fundamental body bending load path and critical systems routing path. Similarly, preserving the existing WLG, WLG aft wheel well bulkhead, and WLG door support structure is beneficial in that it eliminates or reduces the requirement of redesign of the airplane.

An aft retracting BLG trunnion axis, common to the airplane structure, has a predictable overload fusing scenario that can result in a full or partial stowage of the landing gear, substantially reducing the risk to fuel that may be located in the fuselage, aft of the gear.

Embodiments of the disclosure include a forward mounted folding drag brace that stabilizes the shock strut and reacts ground loads. In embodiments, the lower drag brace (in its deployed condition) reacts vertical and lateral loads at the brace apex pin via an uplock mechanism to the keel beam of the airplane. The upper drag brace, oriented horizontally and aft of the apex pin, reacts drag loads to the keel beam. The stowed position of the body landing gear unfolds the drag brace and positions it aft and in line with the keel structure, inside the body contour.

Volumetric integration is successful with sequenced actuation between the wing landing gear and the body landing gear, which enables the prime load path joints at the airplane to be located outside of the kinematic sweeps of the wing landing gear and body door.

Embodiments of the disclosure include two BLG which retract aft, mounted to the aft WLG wheel well bulkhead either side of the keel with a forward cant. The forward cant angle reduces the fore-aft offset between the BLG and WLG by locating the wheel(s) of the BLG in a more forward position than a zero or rearward cant angle. This reduces the negative characteristics of steering and increased BLG loads on takeoff rotation and landing. In addition, this configuration preserves the airplane primary load paths, WLG configuration, and WLG wheel well configuration, all of which reduces or eliminates redesign of the airplane when adding the BLG.

According to various embodiments, a wheeled support structure includes: a shock absorber strut assembly that may be configured to receive a wheel; a fixed strut structure that supports the shock absorber strut assembly, the fixed strut structure having a drag brace connection member and a vehicle structure connection point; a drag brace that comprises an upper drag brace and a lower drag brace; and a pivot joint that connects the fixed truss structure drag brace connection member to the drag brace. The upper drag brace may have a first end configured to be pivotingly attached to a first structural portion of a vehicle, and a second end that may be pivotingly attached to the lower drag brace. The lower drag brace may have a first end that may be pivotingly attached to the second end of the upper drag brace, and a second end that may be pivotingly attached to the pivot joint. The vehicle structure connection point of the fixed strut structure may be configured to pivotingly attach to a second structural portion of the vehicle. The fixed strut structure may be configured to rotate about the second structural portion of the vehicle in a deployment direction from a stowed position to a deployed position. The second end of the upper drag brace may be configured to move in the deployment direction away from the second structural portion of the vehicle as the fixed strut structure rotates from the stowed position to the deployed position. The second end of the upper drag brace may be configured to attach to a drag brace apex attachment portion of the vehicle in the deployed position so as to secure the second end of the upper drag brace to the vehicle in the deployed position.

Various optional features of the above embodiments include the following. The fixed strut structure may comprise a shock absorber strut assembly.

Various optional features of the above embodiments include the following. The fixed strut structure may comprise a plurality of structural members positionally fixed relative to each other in a truss formation.

Various optional features of the above embodiments include the following. An actuator, wherein the actuator may be connected to the fixed strut structure, and the actuator may be connected to a third structural portion of the vehicle.

Various optional features of the above embodiments include the following. The fixed strut structure may comprise a plurality of structural members positionally fixed relative to each other in a truss formation.

Various optional features of the above embodiments include the following. The vehicle is an aircraft, the shock absorber strut assembly, the fixed strut structure and the drag brace may be configured to be stowed in a body landing gear wheel well that shares a common bulkhead with a wing landing gear wheel well of the aircraft.

According to various embodiments, an aircraft includes: a wing landing gear; a wing landing gear wheel well configured to store the wing landing gear in a wing landing gear stowed position; and a body landing gear that includes: a shock absorber strut assembly comprising a wheel, a fixed strut structure that supports the shock absorber strut assembly and has an aircraft structure connection point, and a drag brace; and a pivot joint that connects the fixed truss structure to the drag brace; and a body landing gear wheel well configured to store the body landing gear in a stowed position. The drag brace may comprise an upper drag brace and a lower drag brace. The upper drag brace may have a first end pivotingly attached to a first structural portion of an aircraft, and a second end that is pivotingly attached to the second portion of the lower drag brace. The lower drag brace may have a first end that is pivotingly attached to the second end of the upper drag brace, and a second end that is pivotingly attached to the pivot joint. The aircraft structure connection point of the fixed strut structure may be pivotingly attach to a second structural portion of the aircraft. The fixed strut structure may be configured to rotate about the second structural portion of the vehicle in a deployment direction from the stowed position to a deployed position. The second end of the upper drag brace is configured to move in the deployment direction away from the second structural portion of the aircraft as the fixed strut structure rotates from the stowed position to the deployed position. The second end of the upper drag brace is attached to a drag brace apex attachment portion of the aircraft in the deployed position so as to secure the second end of the upper drag brace to the aircraft in the deployed position.

Various optional features of the above embodiments include the following. In the stowed position, the shock absorber strut assembly, the fixed truss structure, the upper drag brace and the lower drag brace may be positioned outside of a swing path of the wing landing gear of the aircraft. The deployed position, the shock absorber strut assembly, the fixed truss structure, and the lower drag brace may be positioned in the swing path of the wing landing gear of the aircraft.

Various optional features of the above embodiments include the following. The wing landing gear may have a plurality of wheels that are aligned parallel to a longitudinal direction of the aircraft. The plurality of wheels may include a forward-most wheel that is closest to a front of the aircraft of the plurality of wheels. The plurality of wheels may include a rearward-most wheel that is closest to a tail of the aircraft of the plurality of wheels. In the deployed position, the wheel of the body landing gear may be positioned at a body landing gear wheel location. The body landing gear wheel location may be between the forward most wheel and the rearward-most wheel in the longitudinal direction of the aircraft. The body landing gear wheel location may be transversely offset from the plurality of wing landing gear wheels in a transverse direction of the aircraft.

Various optional features of the above embodiments include the following. The fixed strut structure comprises a plurality of structural members positionally fixed relative to each other in a truss formation.

Various optional features of the above embodiments include the following. An actuator may be connected to the fixed strut structure, and the actuator may be connected to a third structural portion of the aircraft.

Various optional features of the above embodiments include the following. The wing landing gear wheel well and the body landing gear wheel well may share a common bulkhead.

Various optional features of the above embodiments include the following. The second structural portion may be the common bulkhead.

Various optional features of the above embodiments include the following. In the stowed position, the upper drag brace may form a first angle with the lower drag brace, in the deployed position, the upper drag brace may form a second angle with the lower drag brace, and the first angle and the second angle may be supplementary angles.

According to various embodiments, an aircraft includes: a wing landing gear; and a body landing gear which includes a shock absorber strut assembly comprising a wheel, a fixed truss structure and an aircraft structure connection point, a drag brace, and a pivot joint that connects the fixed truss structure to the drag brace; and a body landing gear wheel well configured to store the body landing gear in a stowed position. The body landing gear may pivot between the stowed position and a deployed position. The wing landing gear may have a plurality of wheels that are aligned parallel to a longitudinal direction of the aircraft, the plurality of wheels may include a forward-most wheel that is closest to a front of the aircraft of the plurality of wheels, and the plurality of wheels may include a rearward-most wheel that is closest to a tail of the aircraft of the plurality of wheels. In the deployed position, the wheel of the body landing gear may be positioned at a body landing gear wheel location. The body landing gear wheel location may be between the forward most wheel and the rearward-most wheel in the longitudinal direction of the aircraft. The body landing gear wheel location may be transversely offset from the plurality of wing landing gear wheels in a transverse direction of the aircraft. The drag brace comprises an upper drag brace, and a lower drag brace pivotingly attached to the upper drag brace. In the stowed position, the shock absorber strut assembly, the fixed strut structure, the upper drag brace and the lower drag brace may be positioned outside of a swing path of the wing landing gear of the aircraft. In the deployed position, the lower drag brace may be positioned in the swing path of the wing landing gear of the aircraft.

Various optional features of the above embodiments include the following. A wing landing gear wheel well may be configured to store the wing landing gear in a wing landing gear stowed position, and a body landing gear wheel well may be configured to store the body landing gear in the stowed position. The wing landing gear wheel well and the body landing gear wheel well may share a common bulkhead, and the shock absorber strut assembly may be pivotingly attached to the common bulkhead.

Various optional features of the above embodiments include the following. In the stowed position, the upper drag brace may form a first angle with the lower drag brace. In the deployed position, the upper drag brace may form a second angle with the lower drag brace. The first angle and the second angle may be supplementary angles.

Various optional features of the above embodiments include the following. The aircraft structure connection point of the shock absorber strut assembly may be attached to a structural portion in the body landing gear wheel well.

Various optional features of the above embodiments include the following. The upper drag brace may be pivotingly attached to a structural portion of the wing landing gear wheel well.

Various optional features of the above embodiments include the following. In the stowed position, the upper drag brace may form a first angle with the lower drag brace. In the deployed position, the upper drag brace may form a second angle with the lower drag brace. The first angle and the second angle may be supplementary angles.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Various features of the examples can be more fully appreciated, as the same become better understood with reference to the following detailed description of the examples when considered in connection with the accompanying figures, in which.

DETAILED DESCRIPTION

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary examples in which the invention may be practiced. These examples are described in sufficient detail to enable those skilled in the art to practice the invention and it is to be understood that other examples may be utilized and that changes may be made without departing from the scope of the invention. The following description is, therefore, merely exemplary. These and other features and advantages are shown and described herein in reference to the figures.

Aircraft would benefit from the ability to increase the gross weight of the aircraft without requiring a major redesign of the aircraft. Some embodiments provide a body landing gear system that can be incorporated into existing aircraft designs without modifying major structural features of the aircraft.

Figure 1:
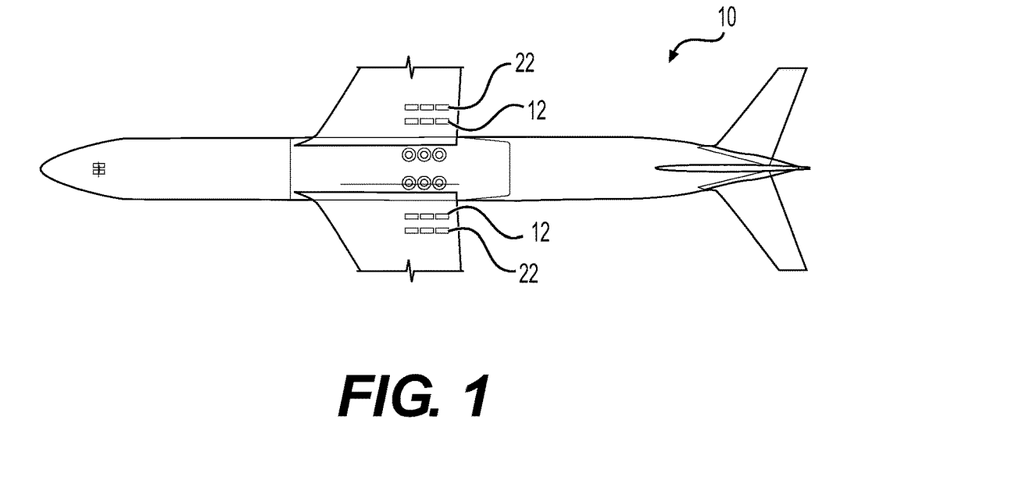
FIG. 1 is a partial plan view of an aircraft with its wing landing gear in a deployed position and retracted in a stowed position.
Figure 2:
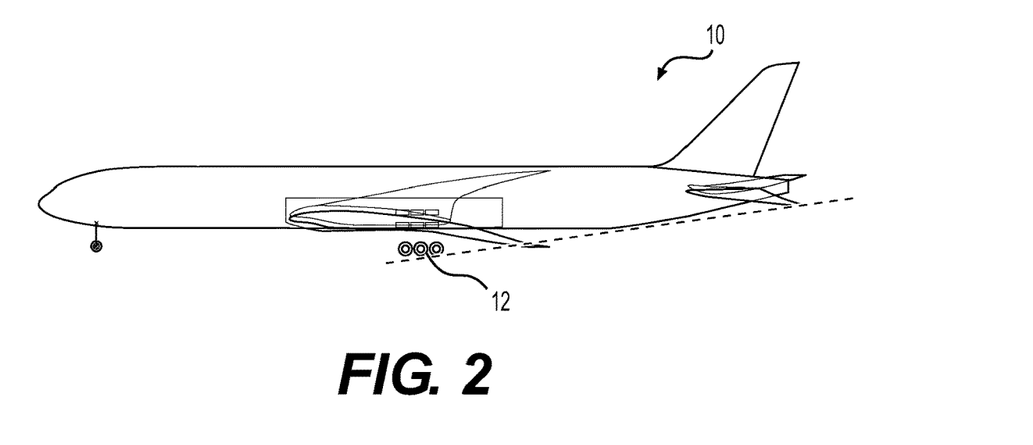
FIG. 2 is a side view of the aircraft of FIG. 1 with its wing landing gear in a deployed position and retracted in a stowed position.
Figure 3:
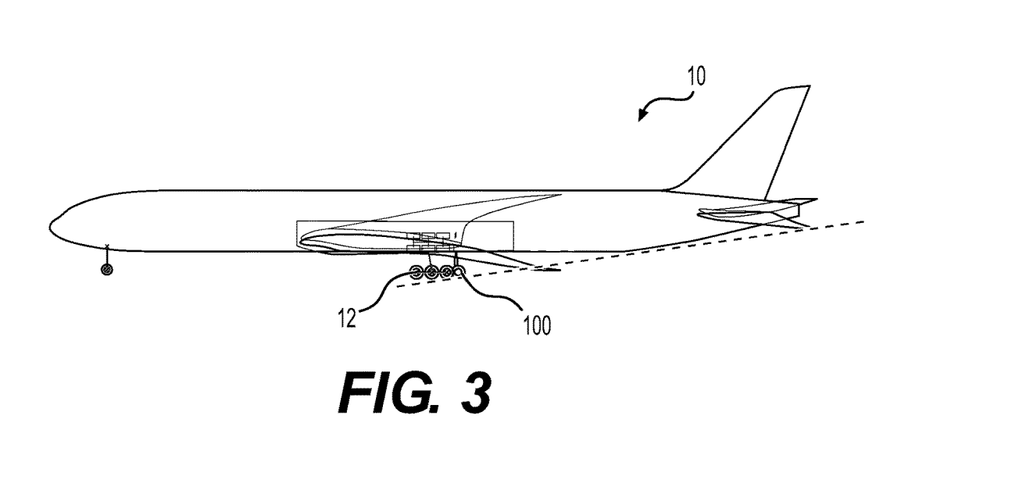
FIG. 3 is a side view of the aircraft of FIG. 1 with its wing landing gear in a deployed position and retracted in a stowed position and an aft retracting body landing gear in deployed positions.
Figure 4:
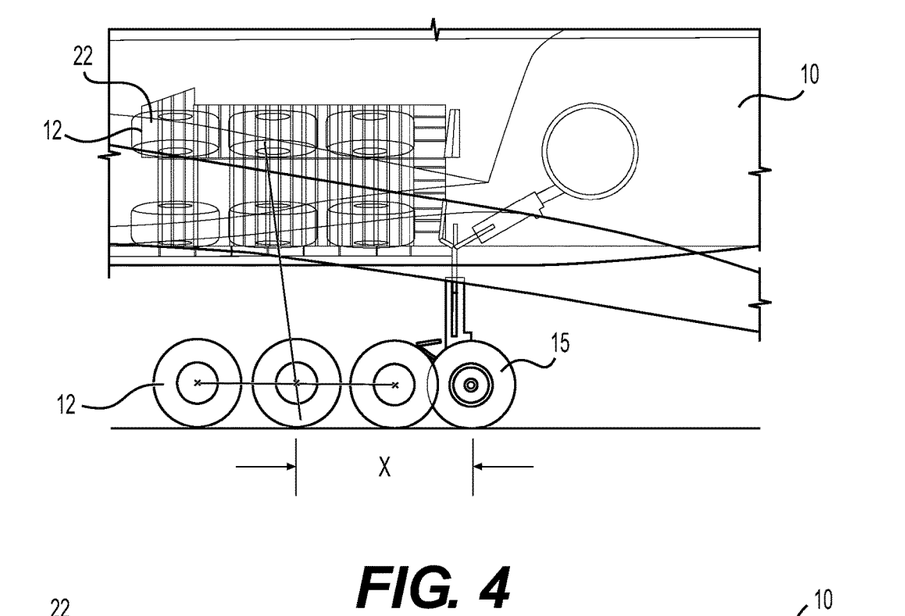
FIG. 4 is an enlarged partial side view of the aircraft of FIG. 3 with its wing landing gear and its aft retracting body landing gear in deployed positions.

FIGS. 1-3 show an aircraft 10 having two wing landing gear 12 that each have six wheels. In this example, the wing landing gear 12 are wing mounted. FIG. 3 shows a body landing gear 100 that has one axle. In other embodiments, the body landing gear has two or more axles. The axle of the body landing gear 100 is located behind the axle of the rear-most wheel of the wing landing gear 12. As stated above, the fore-aft offset between the wing landing gear and body landing gear can result in decreased steering efficiency, which can result in increased turn radius and/or tire scrubbing and/or loading issues on takeoff and landing. FIG. 4 shows the configuration shown in FIG. 3 in more detail. As shown in FIG. 4, an axle, or hub, centerline of a wheel 15 of the body landing gear 100 is located a distance X aft of the centerline of the wing landing gear. Because the centerline of the wheel 15 is aft of the centerline of the axle, or hub, of the rearmost wheel of the wing landing gear, the body landing gear can result in decreased steering efficiency and can be subjected to very high loads as the aircraft 10 rotates.

Figure 5:
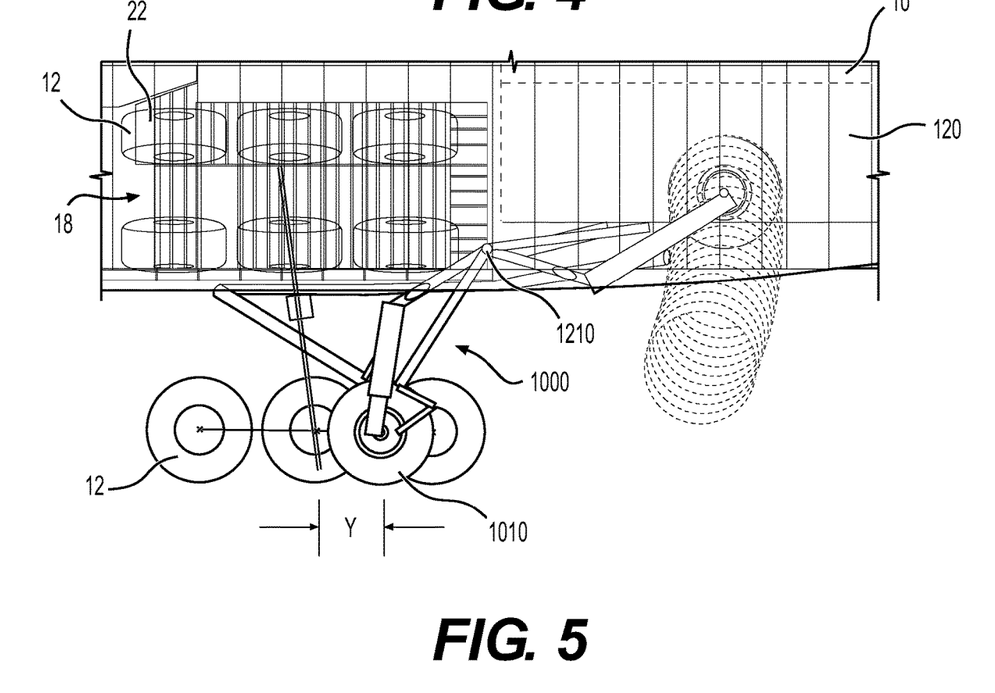
FIG. 5 is a partial side view of an exemplary aft retracting body landing gear in accordance with embodiments of the disclosure.

In contrast, FIG. 5 shows an exemplary embodiment of the disclosure in which the axle, or hub, centerline of a wheel 1010 of a body landing gear 1000 is located a distance Y aft of the centerline of the wing landing gear. This configuration eliminates, or at least significantly reduces, the decrease in steering efficiency and loading issues that can result from the configuration shown in FIG. 4 because the wheel 1010 is located forward of the rear-most wheel of the wing landing gear 12 and much closer to the center wheel of the wing landing gear 12.

Figure 11:
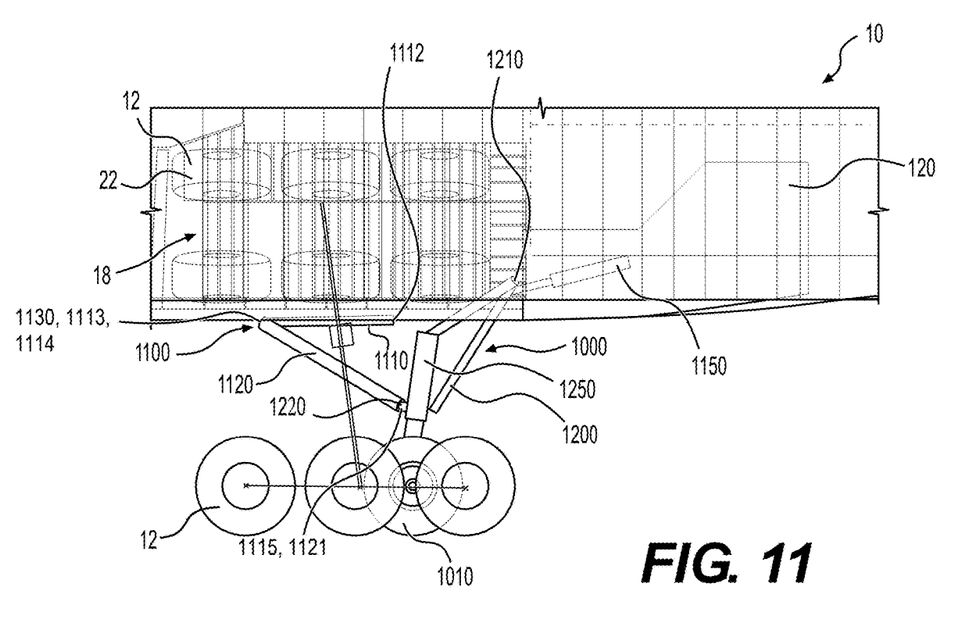
FIG. 11 is partial side view of the aft retracting body landing gear of FIG. 5 in a fully deployed position.

FIGS. 5 and 11 show an exemplary embodiment of the disclosure including a wheeled support structure, for example a body landing gear, 1000. In this example, the body landing gear 1000 has a fixed strut structure 1200 and a shock absorber strut assembly 1250 configured to receive a wheel 1010. In this example, the fixed strut structure 1200 has a vehicle structure connection point 1210. The body landing gear 1000 also includes a drag brace 1100, and a drag brace connection member/point 1220 that connects the fixed strut structure 1200 to the drag brace 1100 at a pivot joint 1121. In this example, the drag brace 1100 has an upper drag brace 1110 and a second portion 1120 that are connected to each other by a pivot point 1130. The upper drag brace 1110 of the drag brace 1100 has a first end 1112 configured to be attached to a first structural portion of a vehicle such as, in this example, the aircraft 10, and a second end 1113 configured to be attached to the second portion 1120 of the drag brace 1100. The second portion 1120 of the drag brace 1100 has a first end 1114 that is configured to be attached to the second end 1113 of the upper drag brace 1110 of the drag brace 1100, and a second end 1115 that is attached to the fixed strut structure 1200. The drag brace 1100 is configured to move between a deployed position (shown in FIG. 5 and FIG. 11) and a stowed position (shown in FIG. 8. In this example, the vehicle structure connection point 1210 of the fixed strut structure 1200 is configured to pivotably attach to a second structural portion of the vehicle. In the example shown in FIGS. 5-11, the first structural portion of the vehicle is located in a wing landing gear wheel well 18, and the second structural portion of the vehicle is located in either the wing landing gear wheel well 18 of a body landing gear wheel well 120. FIG. 5 shows the wing landing gear 12 in both a deployed position, and in a stowed position 22.

Figure 6:
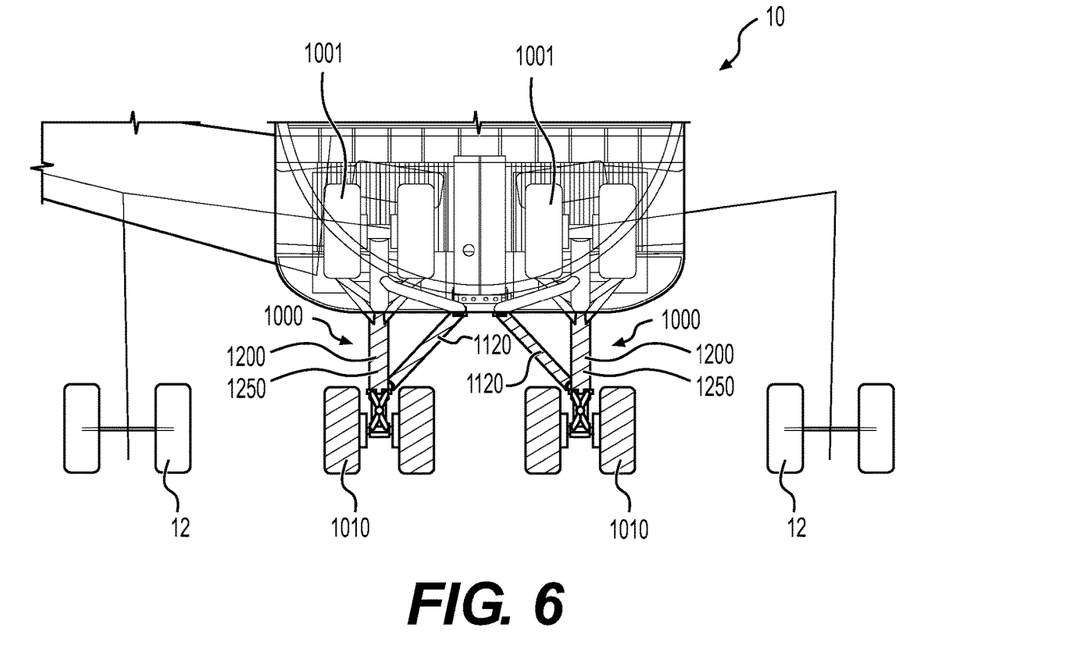
FIG. 6 is a partial aft view of an aircraft showing wing landing gear and two of the aft retracting body landing gear of FIG. 5.
Figure 7:
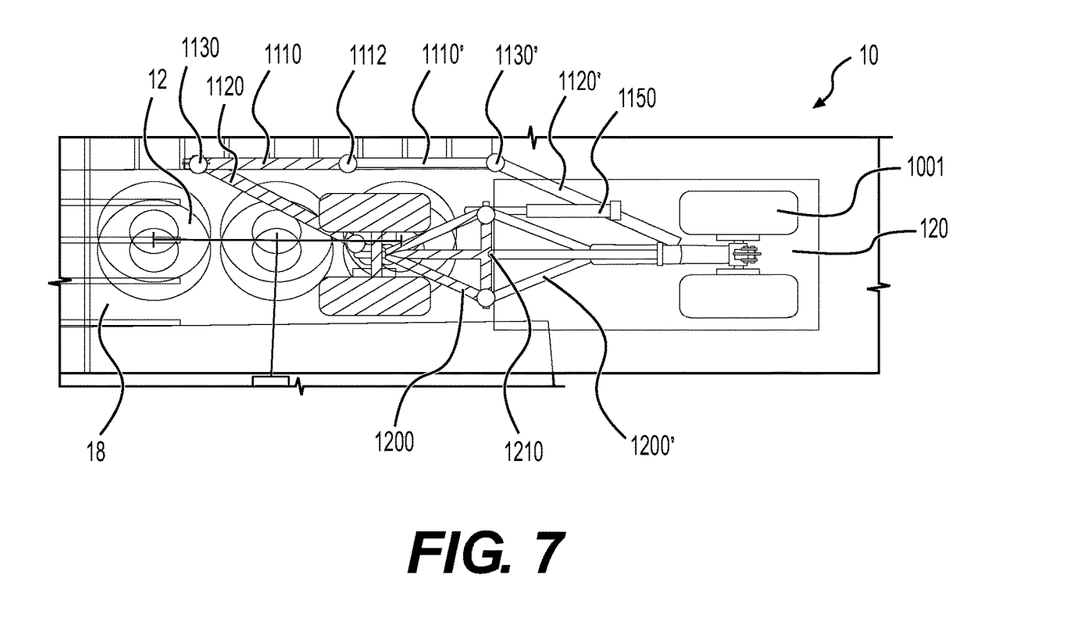
FIG. 7 is a top view of the aft retracting body landing gear of FIG. 5 in both the deployed position and the stowed position.
Figure 8:
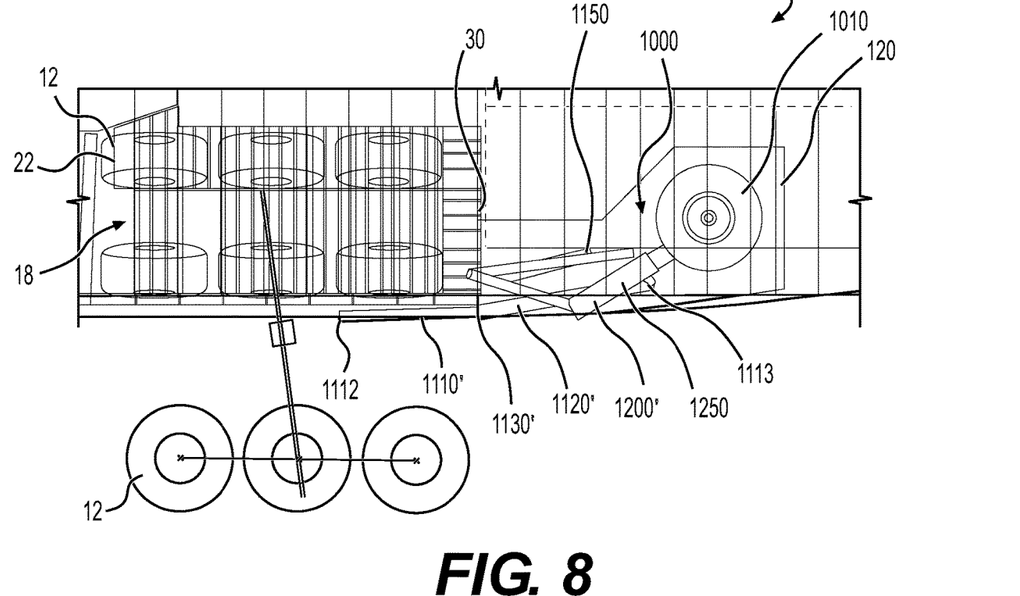
FIG. 8 is a partial side view of the aft retracting body landing gear of FIG. 5 in a stowed position.

FIG. 6 is an aft-looking view of an exemplary configuration in accordance with embodiments of the disclosure. FIG. 6 shows two of the body landing gear 1000 in the deployed position and inboard of the wing landing gear 12 when the wing landing gear 12 is in the deployed position. FIG. 6 also shows the body landing gear 1000 in a stowed position 1001. FIG. 7 is a top view showing the body landing gear 1000 in the stowed position 1001 in the body landing gear wheel well 120. The wing landing gear 12 is also shown in FIG. 7 in the stowed position. Both the deployed position and the stowed position 1001 of body landing gear 1000 are shown in FIGS. 6 and 7 for comparison, but the body landing gear 1000 is in only one of the stowed position 1001 or the deployed position at any one time. In FIGS. 7 and 8, the stowed position of the upper drag brace 1110 is indicated as 1110', the stowed position of the second portion 1120 is indicated as 1120', and the stowed position of the pivot point 1130 is indicated as 1130'. Also, in FIGS. 7 and 8, the stowed position of the fixed strut structure 1200 is indicated as 1200'.

In this example, in the stowed position shown in FIGS. 7 and 8, the upper drag brace 1110, 1110' is parallel to a side wall of the wing landing gear wheel well 18. This position of the upper drag brace 1110, 1110' in the stowed position of the body landing gear 1000 allows wing landing gear 12 to enter and exit the wing landing gear wheel well 18 during deployment and retraction of the wing landing gear 12 without contacting the stowed body landing gear 1000. During deployment of the body landing gear 1000, as shown in the progression of FIGS. 8-12 and the top view shown in FIG. 7, the upper drag brace 1110 of the drag brace 1100 pivots about its first end 1112 (that is secured to a first structural portion of the aircraft 10) downward, forward, and then upward to the position shown in FIG. 11 (the deployed position of body landing gear 1000). As shown in FIGS. 6, 7 and 11, in the deployed position of the body landing gear 1000, the second portion 1120 of the drag brace 1100 is in a diagonal orientation below the wing landing gear wheel well 18.

In this example, the fixed strut structure 1200 includes the shock absorber strut assembly 1250 which includes, for example, an outer cylinder and an inner cylinder and a spring to absorb shock when the aircraft 10 is landing, and a damper to reduce oscillation of the spring. In this example, the fixed strut structure 1200 comprises a plurality of structural members positionally fixed relative to each other in a truss formation, as shown in FIGS. 5-11. An actuator 1150 such as, for example, a hydraulic actuator, is connected to the fixed strut structure 1200, and a third structural portion of the vehicle such as, for example, the body landing gear wheel well 120. The actuator 1150 provides the force required to deploy and retract the body landing gear 1000.

FIGS. 8-11 show the fixed strut structure 1200 and the drag brace 1100 being configured to be stowed in a compartment such as, for example, the body landing gear wheel well 120. The body landing gear wheel well 120 has, in this example, one or more door that opens to allow the body landing gear 1000 to deploy, they can be moved to the closed position when the body landing gear 1000 is in the stowed position. In this example, the body landing gear wheel well 120 shares a common bulkhead 30 with the main landing gear wheel well or compartment 18 of the aircraft 10.

Figure 9:
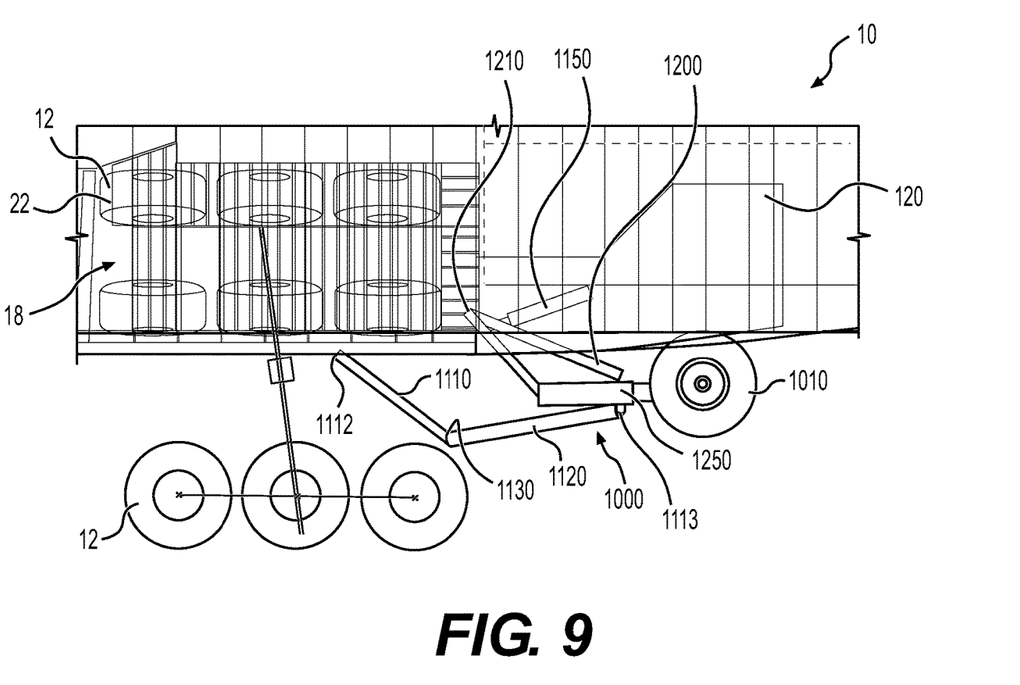
FIG. 9 is a partial side view of the aft retracting body landing gear of FIG. 5 in a partially deployed position.
Figure 10:
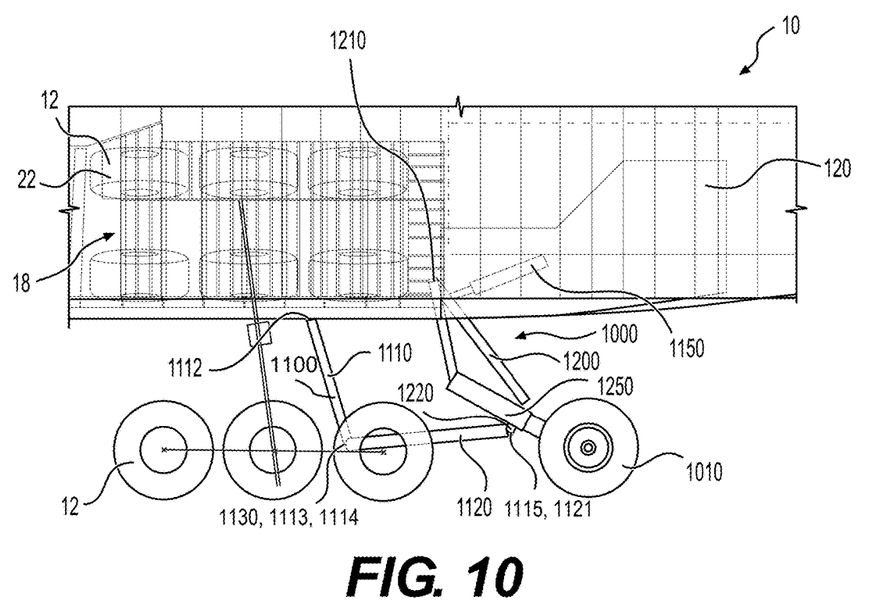
FIG. 10 is a partial side view of the aft retracting body landing gear of FIG. 5 in a partially deployed position.

As stated above, FIGS. 8-11 shows the body landing gear 1000 in various stages of deployment. FIG. 8 shows the body landing gear 1000 in the stowed position in the body landing gear wheel well 120. FIG. 9 shows the body landing gear 1000 in a partially deployed position in which the body landing gear 1000 is partially in the body landing gear wheel well 120. FIG. 10 shows the body landing gear 1000 in a partially deployed position in which the body landing gear 1000 is in a more deployed position than in FIG. 9 but is not yet in a fully deployed position.

FIG. 11 shows the body landing gear 1000 in the deployed (or fully deployed) position in which the body landing gear 1000 is in the position for use (landing and when the aircraft 10 is on the ground).

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

While the invention has been described with reference to the exemplary examples thereof, those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A wheeled support structure, comprising:
   a shock absorber strut assembly configured to receive a wheel;
   a fixed strut structure that supports the shock absorber strut assembly, the fixed strut structure having a drag brace connection member and a vehicle structure connection point;
   a drag brace that comprises an upper drag brace and a lower drag brace; and
   a pivot joint that connects the fixed strut structure drag brace connection member to the drag brace, wherein the upper drag brace has a first end configured to be pivotingly attached to a first structural portion of a vehicle, and a second end that is pivotingly attached to the lower drag brace, the lower drag brace has a first end that is pivotingly attached to the second end of the upper drag brace, and a second end that is pivotingly attached to the pivot joint, the vehicle structure connection point of the fixed strut structure is configured to pivotingly attach to a second structural portion of the vehicle, the fixed strut structure is configured to rotate about the second structural portion of the vehicle in a deployment direction from a stowed position to a deployed position, the second end of the upper drag brace is configured to move in the deployment direction away from the second structural portion of the vehicle as the fixed strut structure rotates from the stowed position to the deployed position, and the second end of the upper drag brace is configured to attach to a drag brace apex attachment portion of the vehicle in the deployed position so as to secure the second end of the upper drag brace to the vehicle in the deployed position.

2. The support structure of claim 1, wherein the fixed strut structure comprises a plurality of structural members positionally fixed relative to each other in a truss formation.

3. The support structure of claim 1, further comprising an actuator, wherein the actuator is connected to the fixed strut structure, and the actuator is connected to a third structural portion of the vehicle.

4. The support structure of claim 3, wherein the fixed strut structure comprises a plurality of structural members positionally fixed relative to each other in a truss formation.

5. The support structure of claim 1, wherein the vehicle is an aircraft, the shock absorber strut assembly, the fixed strut structure and the drag brace are configured to be stowed in a landing gear compartment that shares a common bulkhead with a main landing gear compartment of the aircraft.

6. An aircraft, comprising:
a wing landing gear;
a wing landing gear wheel well configured to store the wing landing gear in a wing landing gear stowed position; and
a body landing gear, comprising:
a shock absorber strut assembly comprising a wheel;
a fixed strut structure that supports the shock absorber strut assembly and has an aircraft structure connection point;
a drag brace; and
a pivot joint that connects the fixed strut structure to the drag brace; and
a body landing gear wheel well configured to store the body landing gear in a stowed position,
wherein the drag brace comprises an upper drag brace and a lower drag brace,
the upper drag brace has a first end pivotingly attached to a first structural portion of the aircraft, and a second end that is pivotingly attached to the lower drag brace,
the lower drag brace has a first end that is pivotingly attached to the second end of the upper drag brace, and a second end that is pivotingly attached to the pivot joint,
the aircraft structure connection point of the fixed strut structure is pivotingly attach to a second structural portion of the aircraft, the fixed strut structure is configured to rotate about the second structural portion of the aircraft in a deployment direction from the stowed position to a deployed position, the second end of the upper drag brace is configured to move in the deployment direction away from the second structural portion of the aircraft as the fixed strut structure rotates from the stowed position to the deployed position, and the second end of the upper drag brace is attached to a drag brace apex attachment portion of the aircraft in the deployed position so as to secure the second end of the upper drag brace to the aircraft in the deployed position.

7. The aircraft of claim 6, wherein in the stowed position, the shock absorber strut assembly, the fixed strut structure, the upper drag brace and the lower drag brace are positioned outside of a swing path of the wing landing gear of the aircraft, and in the deployed position, the shock absorber strut assembly, the fixed strut structure, and the lower drag brace are positioned in the swing path of the wing landing gear of the aircraft.

8. The aircraft of claim 6, wherein the wing landing gear has a plurality of wheels that are aligned parallel to a longitudinal direction of the aircraft, the plurality of wheels includes a forward-most wheel that is closest to a front of the aircraft, the plurality of wheels includes a rearward-most wheel that is closest to a tail of the aircraft, in the deployed position, the wheel of the body landing gear is positioned at a body landing gear wheel location, the body landing gear wheel location is between the forward most wheel and the rearward-most wheel in the longitudinal direction of the aircraft, and the body landing gear wheel location is transversely offset from the plurality of wing landing gear wheels in a transverse direction of the aircraft.

9. The aircraft of claim 8, wherein the fixed strut structure comprises a plurality of structural members positionally fixed relative to each other in a truss formation.

10. The aircraft of claim 6, wherein the fixed strut structure comprises a plurality of structural members positionally fixed relative to each other in a truss formation.

11. The aircraft of claim 6, further comprising an actuator, wherein the actuator is connected to the fixed strut structure, and the actuator is connected to a third structural portion of the aircraft.

12. The aircraft of claim 6, wherein the wing landing gear wheel well and the body landing gear wheel well share a common bulkhead.

13. The aircraft of claim 12, wherein the second structural portion is the common bulkhead.

14. The aircraft of claim 13, wherein in the stowed position, the upper drag brace forms a first angle with the lower drag brace, in the deployed position, the upper drag brace forms a second angle with the lower drag brace, and the first angle and the second angle are supplementary angles.

15. An aircraft, comprising:
a wing landing gear; and
a body landing gear, comprising:
a shock absorber strut assembly comprising a wheel, a fixed strut structure and an aircraft structure connection point;

a drag brace;
a pivot joint that connects the fixed strut structure to the drag brace; and
a body landing gear wheel well configured to store the body landing gear in a stowed position,
wherein the body landing gear pivots between the stowed position and a deployed position,
the wing landing gear has a plurality of wheels that are aligned parallel to a longitudinal direction of the aircraft,
the plurality of wheels includes a forward-most wheel that is closest to a front of the aircraft,
the plurality of wheels includes a rearward-most wheel that is closest to a tail of the aircraft,
in the deployed position, the wheel of the body landing gear is positioned at a body landing gear wheel location,
the body landing gear wheel location is between the forward most wheel and the rearward-most wheel in the longitudinal direction of the aircraft,
the body landing gear wheel location is transversely offset from the plurality of wing landing gear wheels in a transverse direction of the aircraft,
the drag brace comprises an upper drag brace, and a lower drag brace pivotingly attached to the upper drag brace,
in the stowed position, the shock absorber strut assembly, the fixed strut structure, the upper drag brace and the lower drag brace are positioned outside of a swing path of the wing landing gear of the aircraft, and
in the deployed position, the lower drag brace is positioned in the swing path of the wing landing gear of the aircraft.

16. The aircraft of claim 15, further comprising a wing landing gear wheel well configured to store the wing landing gear in a wing landing gear stowed position,
wherein the wing landing gear wheel well and the body landing gear wheel well share a common bulkhead, and
the shock absorber strut assembly is pivotingly attached to the common bulkhead.

17. The aircraft of claim 16, wherein in the stowed position, the upper drag brace forms a first angle with the lower drag brace,
in the deployed position, the upper drag brace forms a second angle with the lower drag brace, and
the first angle and the second angle are supplementary angles.

18. The aircraft of claim 15,
wherein the aircraft structure connection point of the shock absorber strut assembly is attached to a structural portion in the body landing gear wheel well.

19. The aircraft of claim 15, further comprising a wing landing gear wheel well,
wherein the upper drag brace is pivotingly attached to a structural portion of the wing landing gear wheel well.

20. The aircraft of claim 15, wherein in the stowed position, the upper drag brace forms a first angle with the lower drag brace,
in the deployed position, the upper drag brace forms a second angle with the lower drag brace, and
the first angle and the second angle are supplementary angles.

* * * * *